US008423620B2

(12) United States Patent
Keum et al.

(10) Patent No.: US 8,423,620 B2
(45) Date of Patent: Apr. 16, 2013

(54) APPARATUS AND METHOD FOR TESTING WEB SERVICE INTEROPERABILITY

(75) Inventors: Chang-Sup Keum, Daejeon-si (KR); Sang-Ki Kim, Daejeon-si (KR); Byung-Sun Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 300 days.

(21) Appl. No.: 12/850,150

(22) Filed: Aug. 4, 2010

(65) Prior Publication Data

US 2011/0138001 A1 Jun. 9, 2011

(30) Foreign Application Priority Data

Dec. 4, 2009 (KR) .................. 10-2009-0120025

(51) Int. Cl.
*G06F 15/16* (2006.01)
*G06F 15/173* (2006.01)

(52) U.S. Cl.
USPC ........................ 709/206; 709/223; 709/224

(58) Field of Classification Search .......... 709/201–203, 709/223–224
See application file for complete search history.

(56) References Cited

U.S. PATENT DOCUMENTS

| 7,702,749 | B2 * | 4/2010 | Meredith et al. | 709/219 |
|---|---|---|---|---|
| 7,886,188 | B2 * | 2/2011 | Gorman et al. | 714/25 |
| 2005/0257098 | A1 * | 11/2005 | Andrews et al. | 714/43 |
| 2006/0277606 | A1 * | 12/2006 | Yunus et al. | 726/25 |
| 2007/0168971 | A1 * | 7/2007 | Royzen et al. | 717/124 |

(Continued)

FOREIGN PATENT DOCUMENTS

| KR | 1999-015377 | 3/1999 |
|---|---|---|
| KR | 1020040051876 | 6/2004 |

OTHER PUBLICATIONS

Parastatidis, Savas et al., "An Introduciton to the SOAP Service Description Language," retrieved online at http://citeseerx.ist.psu.edu/viewdoc/summary?doi=10.1.1.63.5620, 24 pages, (2005).

*Primary Examiner* — Joshua Joo
(74) *Attorney, Agent, or Firm* — Nelson Mullins Riley & Scarborough LLP; EuiHoon Lee, Esq.

(57) ABSTRACT

An apparatus and method for testing web service interoperability. The apparatus includes a state model generator generating a state model of a composition system expressing an operation of exchanging a message when web services interoperate with each other as a state machine on the basis of content of a simple object access protocol (SOAP) service description language (SSDL) web service specification, a test structure generator generating a web service test structure by including information about an operating environment in which a web service test is carried out in a composition system structure that includes structured information about web services performing a message exchange operation, a test case generator generating a test case including definitions of execution functions for testing whether or not the web services interoperate with each other according to a message exchange operation sequence defined in the SSDL specification, from the state model of the composition system and information about the web service test structure, and a test case executor inputting a value to the test case to cause test target web services to execute the test case and testing whether the web services interoperate with each other according to the message exchange operation sequence defined in the SSDL specification.

11 Claims, 8 Drawing Sheets

U.S. PATENT DOCUMENTS

| | | | |
|---|---|---|---|
| 2007/0277158 A1* | 11/2007 | Li et al. | 717/135 |
| 2008/0059558 A1* | 3/2008 | Singh et al. | 709/202 |
| 2008/0109681 A1* | 5/2008 | De Pauw et al. | 714/38 |
| 2009/0132856 A1* | 5/2009 | Gorman et al. | 714/27 |
| 2009/0164621 A1* | 6/2009 | Kothari et al. | 709/224 |
| 2009/0282136 A1* | 11/2009 | Subramanian | 709/222 |

* cited by examiner

FIG. 3

| | CONTENT OF SSDL SPECIFICATION | CONVERTED FSP |
|---|---|---|
| 31 | `<<ssdl:msgref ref="msgs:msg1" direction="out" sc:participant="p1"/>` | ACT1=(send_msg1_p1->END). |
| 32 | `<ssdl:msgref ref="msgs:msg2" direction="in" sc:participant="p2"/>` | ACT2=(receive_msg2_p2->END). |
| 33 | `<sc:sequence>`<br>`<ssdl:msgref ref="msgs:msg1" t="p1"/>`<br>`<ssdl:msgref ref="msgs:msg2" direction="in" sc:participant="p2"/>`<br>`</sc:sequence>` | ACT1=(send_msg1_p1->END).<br>ACT2=(receive_msg2_p2->END).<br>SEQUENCE1=ACT1;ACT2;END. |
| 34 | `<sc:choice>`<br>`<sc:sequence>`<br>`<ssdl:msgref ref="msgs:msg1" direction="in" sc:participant="p1"/>`<br>`<ssdl:msgref ref="msgs:msg2" direction="out" sc:participant="p2"/>`<br>`</sc:sequence>`<br>`<sc:sequence>`<br>`<ssdl:msgref ref="msgs:msg3" direction="in" sc:participant="p1"/>`<br>`<ssdl:msgref ref="msgs:msg4" direction="out" sc:participant="p2"/>`<br>`</sc:sequence>`<br>`</sc:choice>` | ACT1=(send_msg2_p2->END).<br>ACT2=(send_msg4_p2->END).<br>CHIOCE1=(receive_msg1_p1->ACT1;END \| receive_msg1_p1->ACT2;END ). |
| 35 | `<sc:parallel>`<br>`<ssdl:msgref ref="msgs:msg1" direction="in" sc:participant="p1"/>`<br>`<ssdl:msgref ref="msgs:msg2" direction="in" sc:participant="p1"/>`<br>`</sc:parallel>` | ACT1=(receive_msg1_p1->END).<br>ACT2=(receive_msg2_p1->END).<br>PARALLEL1=(ACT1 \|\| ACT2). |
| 36 | `<sc:>multiple>`<br>`<sc:sequence>`<br>`<ssdl:msgref ref="msgs:msg1" direction="out" sc:participant="p1"/>`<br>`<ssdl:msgref ref="msgs:msg2" direction="in" sc:participant="p2"/>`<br>`</sc:sequence>`<br>`</sc:>multiple>` | ACT1=(send_msg1_p1->END).<br>ACT2=(receive_msg2_p2->END).<br>SEQUENCE1=ACT1;ACT2;END.<br>\|\|PROCESS1=SEQUENCE1.<br>\|\|MULTIPLE1=(PROCESS1\|\|PRCESS1\|\|PROCESS1\|\|...\|\|PROCESS1) |

FIG. 7

| TEST GOAL | TEST CASE |
|---|---|
| T1:<br>(S1, OrderAccepted) | TC1:<br>TesterA!ItemOrder<br>  TesterA?OrderAck<br>    State_Verify(OrderAccepted) |
| T2:<br>(S1, OrderRejected) | TC2:<br>TesterA!ItemOrder<br>  TesterA?OrderNOK<br>    State_Verify(OrderRejected) |
| T3:<br>(S1, OrderAccepted, PatmentCaptured) | TC3:<br>Preamble(OrderAccpeted)<br>  PCO1?PaymentAuthRq<br>  PCO1?PaymentAuthRp<br>    State_Verify(Authorized) |
| T4:<br>(S1, OrderAccepted, UnAuthorized) | TC4:<br>Preamble(OrderAccpeted)<br>  PCO1?PaymentAuthRq<br>  PCO1?PayFault<br>    TesterA?PaymentFault<br>    State_Verify(UnAuthorized) |
| ... | |

APPARATUS AND METHOD FOR TESTING WEB SERVICE INTEROPERABILITY

CROSS-REFERENCE TO RELATED APPLICATION

This application claims the benefit under 35 U.S.C. §119 (a) of Korean Patent Application No. 10-2009-0120025, filed on Dec. 4, 2009, the entire disclosure of which is incorporated herein by reference for all purposes.

BACKGROUND

1. Field

The following description relates to an apparatus and method for testing web service interoperability, and more particularly, to an apparatus and method for testing whether or not web services constituting a business process normally interoperate with each other.

2. Description of the Related Art

In general, web services are technology for supporting an Internet-based distributed computing environment using extensible markup language (XML)-based open standards. Also, web services provide data and service to an application program in logical units of another application program.

Web services use standardized web protocols and data formats such as hypertext transport protocol (HTTP), XML, and simple object access protocol (SOAP) to make an application program. Using the standardized web protocols and data formats, web services ensure smooth data flow among multiple computers regardless of a specific platform.

A web service may be separately used, or may be used together with other web services to compose a business process or value-added application service. A business process is systematically tested to detect and correct an error in advance, so that stability of the business process can be ensured.

However, when a business process is tested, web services constituting the business process are provided in the form of a black box and information on internal operations is insufficient. Also, since only static information such as a SOAP message format is provided or description of internal operations is mainly provided in informal documents, a web service may be misinterpreted when it is called from the outside and used.

Furthermore, a business providing system may crash when a business process composed of web services malfunctions, and an error that does not occur when one web service is separately tested may occur when the web service composes a new business process together with another web service.

As described above, a conventional web service test suggests methods for web service conformance in which it is checked whether one web service normally operates, but cannot suggest a method for efficiently testing whether composite web services systematically interoperate with each other.

SUMMARY

The following description relates to an apparatus and method for testing web service interoperability that generate a test case from a state model of a composition system generated on the basis of a simple object access protocol (SOAP) service description language (SSDL) specification and a web service test structure, and test web services using the test case to determine whether or not the web services interoperating with each other on the basis of a message to provide a business process functionally operate without problems.

Here, the apparatus and method for testing web service interoperability test the interoperating web services using the test case generated from the state model of a composition system and the web service test structure to detect an error in control flow and data flow that may occur when web services in the form of a black box are combined.

In one general aspect, there is provided an apparatus for testing web service interoperability, the apparatus including: a state model generator generating a state model of a composition system expressing an operation of exchanging a message when web services interoperate with each other as a state machine on the basis of content of a simple object access protocol (SOAP) service description language (SSDL) web service specification; a test structure generator generating a web service test structure by including information about an operating environment in which a web service test is carried out in a composition system structure that includes structured information about web services performing a message exchange operation; a test case generator generating a test case including definitions of execution functions for testing whether or not the web services interoperate with each other according to a message exchange operation sequence defined in the SSDL specification, from the state model of the composition system and information about the web service test structure; and a test case executor inputting a value to the test case to cause test target web services to execute the test case and testing whether the web services interoperate with each other according to the message exchange operation sequence defined in the SSDL specification.

In another general aspect, there is provided a method of testing web service interoperability, the method including: generating, at a state model generator, a state model of a composition system expressing an operation of exchanging a message when web services interoperate with each other as a state machine on the basis of content of a simple object access protocol (SOAP) service description language (SSDL) web service specification; generating, at a test structure generator, a web service test structure by including information about an operating environment in which a web service test is carried out in a composition system structure that includes structured information about web services performing a message exchange operation; generating, at a test case generator, a test case including definitions of execution functions for testing whether or not the web services interoperate with each other according to a message exchange operation sequence defined in the SSDL specification, from the state model of the composition system and information about the web service test structure; and inputting, at a test case executor, a value to the test case to cause test target web services to execute the test case and testing whether the web services interoperate with each other according to the message exchange operation sequence defined in the SSDL specification.

Additional aspects of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

FIG. 3 illustrates a rule for converting a web service operation into a finite state process (FSP) according to an exemplary embodiment of the present invention.

FIG. 7 illustrates a test case generated from the test structure of FIG. 5 and the state model of a composition system of FIGS. 6A and 6B.

DETAILED DESCRIPTION

Figure 1:
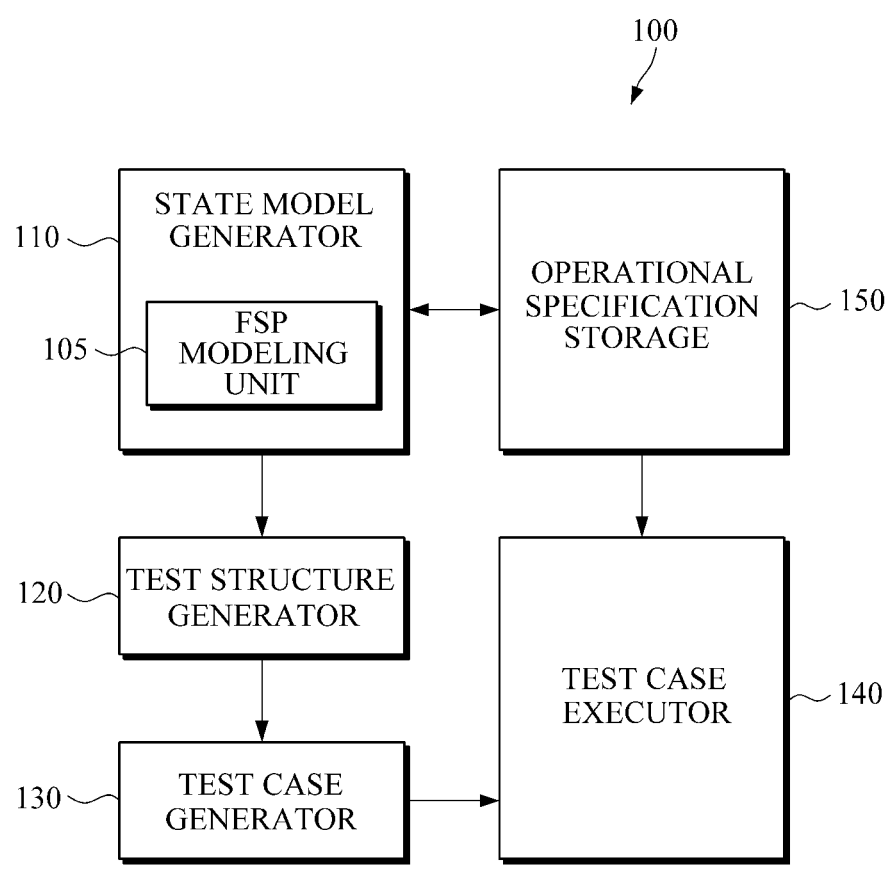
FIG. 1 is a block diagram of an apparatus for testing web service interoperability according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Figure 2:
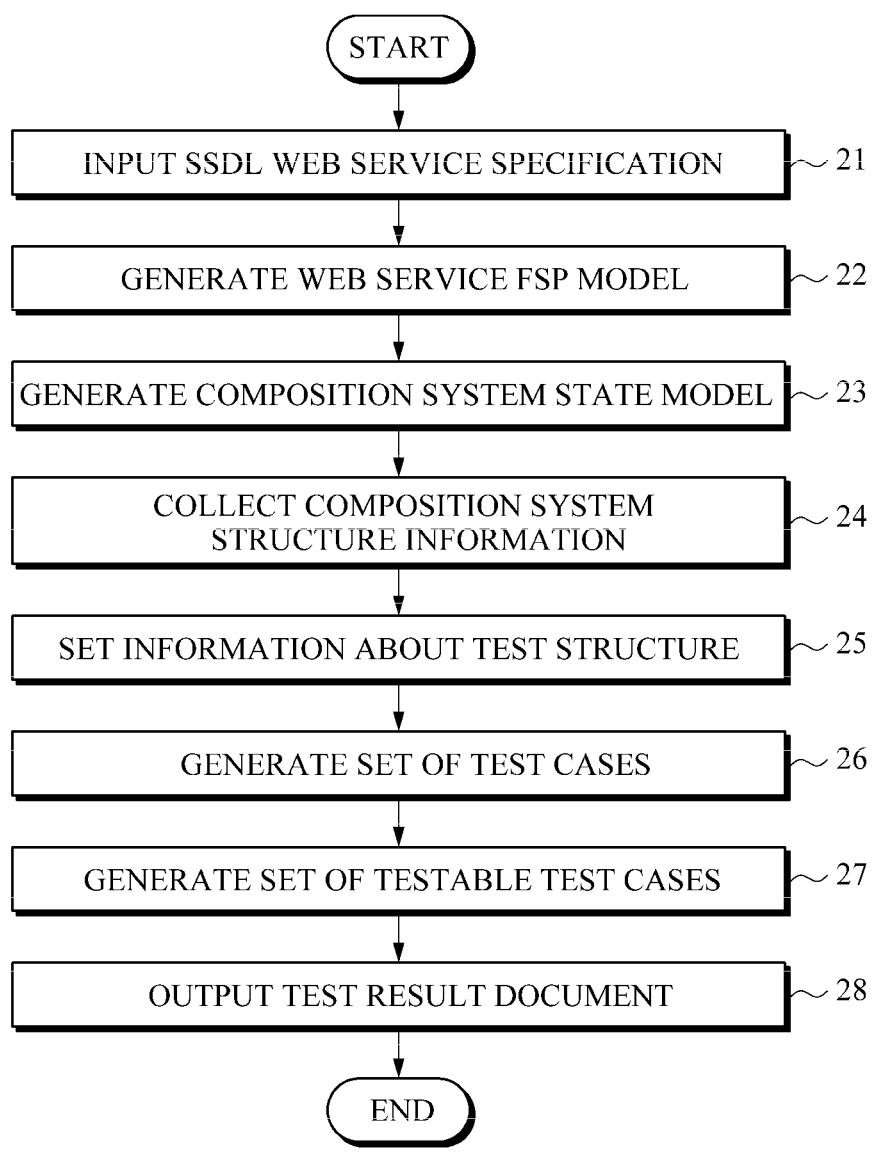
FIG. 2 is a flowchart illustrating a method of testing web service interoperability using the apparatus for testing web service interoperability of FIG. 1.

FIG. 1 is a block diagram of an apparatus for testing web service interoperability according to an exemplary embodiment of the present invention. FIG. 2 is a flowchart illustrating a method of testing web service interoperability using the apparatus for testing web service interoperability of FIG. 1. To aid in understanding exemplary embodiments of the present invention, FIGS. 1 and 2 will be described below together.

The apparatus for testing web service interoperability according to an exemplary embodiment of the present invention includes a state model generator 110, a test structure generator 120, a test case generator 130, a test case executor 140, and an operational specification storage 150.

The state model generator 110 includes a finite state process (FSP) modeling unit 105 that models the content of a simple object access protocol (SOAP) service description language (SSDL) web service specification (referred to as "SSDL specification") into a web service FSP, and generates a state model of a composition system on the basis of the modeled content. Here, an FSP expresses an operational specification as a state machine using a language for specifying an abstract workflow, and a composition system is a business process composed of service components.

Figure 6A:
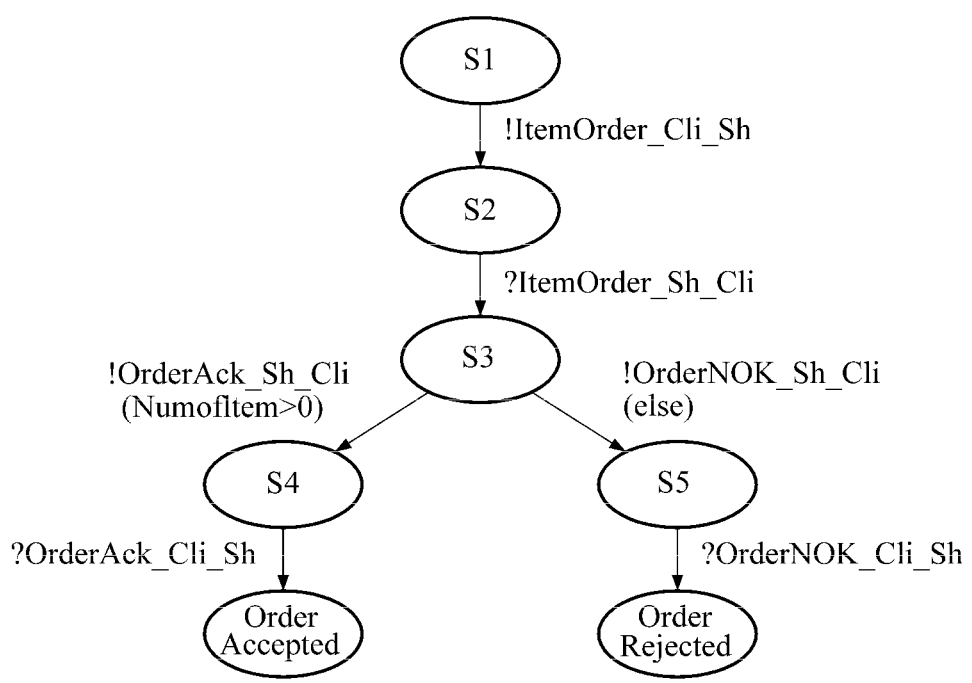
FIGS. 6A and 6B illustrate a state model of a composition system according to an exemplary embodiment of the present invention.
Figure 6B:
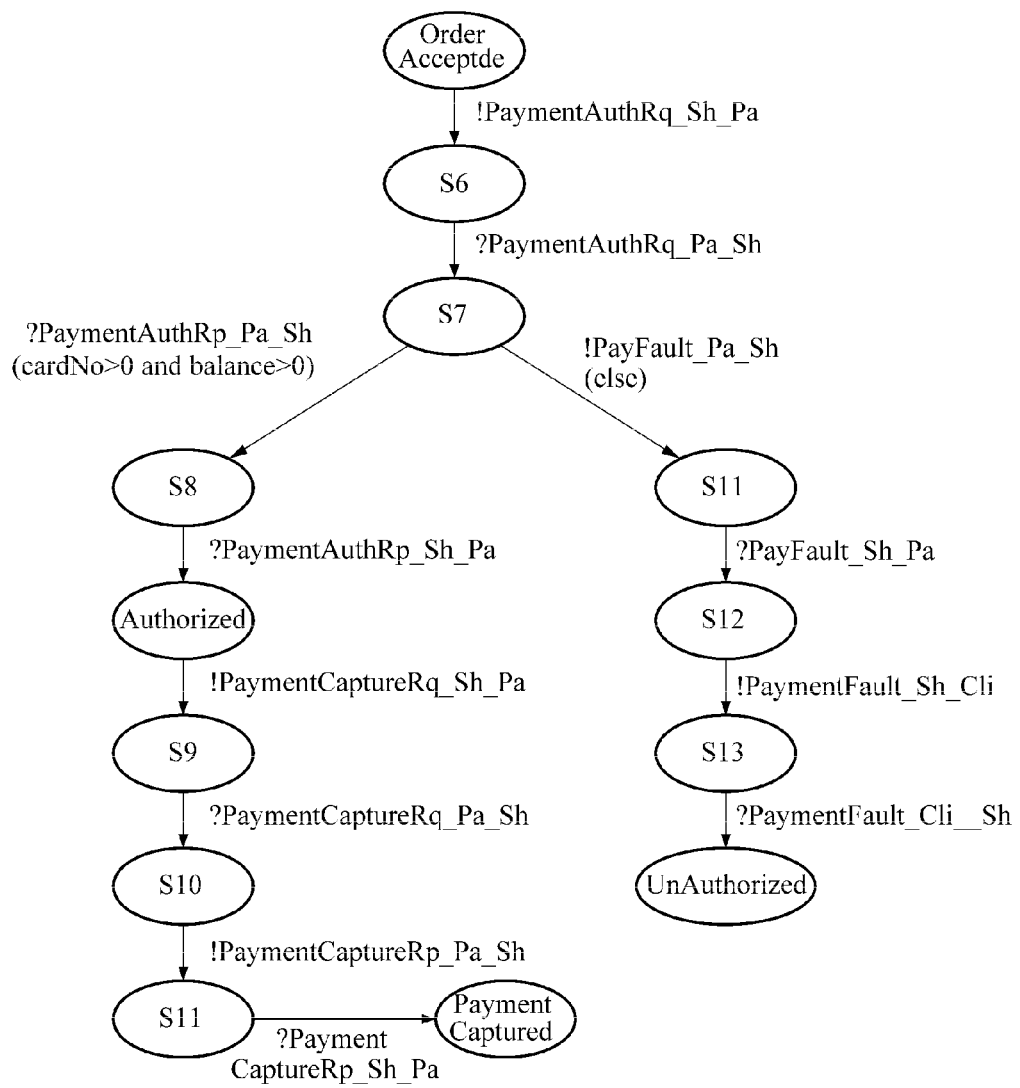

To be specific, the state model generator 110 generates a web service FSP model on the basis of the content of an SSDL specification (21 and 22), and a state model of a composition system is generated on the basis of the modeled content (23). At this time, a method of modeling the content of the SSDL specification into a web service FSP may comply with a conversion rule of FIG. 3, which will be described later. The state model of the composition system expresses an operation of exchanging a message when web services interoperate with each other as a state machine, which is illustrated in FIGS. 6A and 6B by examples to be described later. More specifically, the state model of the composition system expresses in what state what kind of message can be exchanged when web services interoperate with each other as a state machine.

The test structure generator 120 analyzes the content of the SSDL specification and collects information about the structure of the composition system (referred to as "composition system structure") (24). Here, the composition system structure includes structured information about web services performing a message exchange operation.

Figure 4:
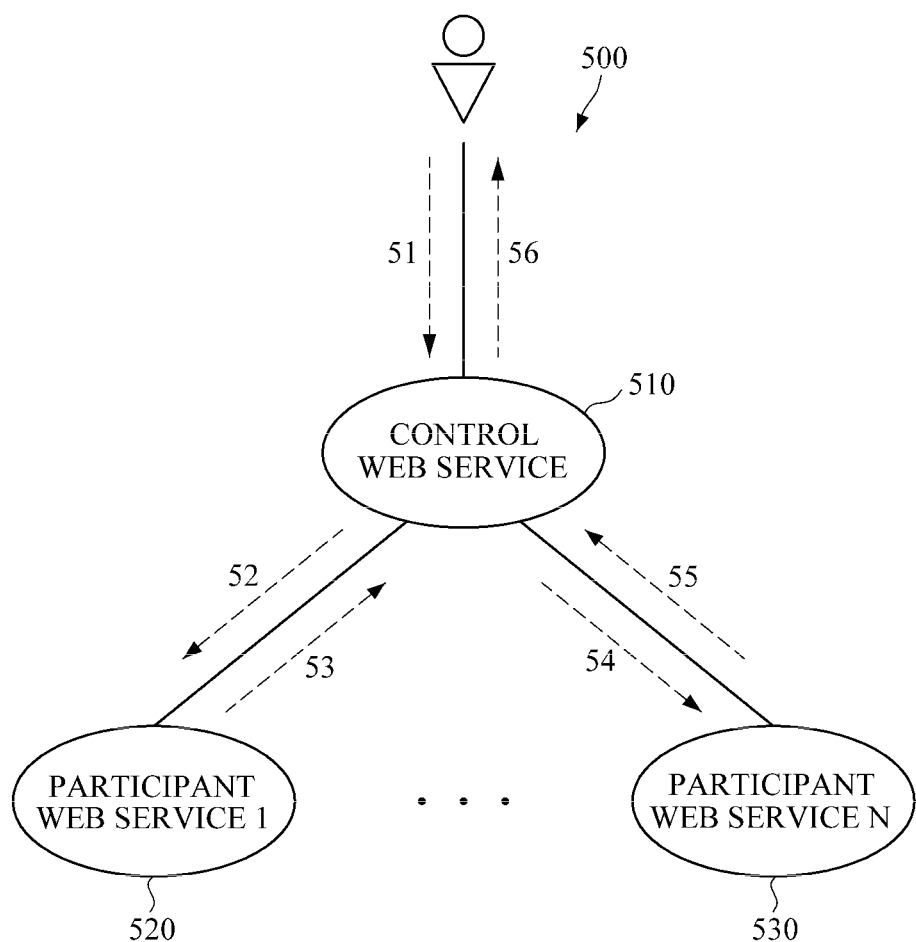
FIG. 4 illustrates a logical composition system structure according to an exemplary embodiment of the present invention.

In other words, content related to the message exchange operation of the separate web services is included in the SSDL specification, and thus the information about the composition system structure indicating how the respective web services synthetically interoperate with each other can be collected by analyzing the content. FIG. 4 that will be described later illustrates such a composition system structure as a logical relationship.

The test structure generator 120 includes information about an operating environment, in which a web service test is carried out, in the composition system structure including the structured information about the web services performing a message exchange operation, thereby generating information about a web service test structure (referred to as "test structure") (25).

To be specific, the information about the operating environment includes the types and number of test apparatuses, information about a used test monitor, information about the locations of the test apparatuses and the test monitor, and so on. And, the test structure generator 120 includes the information about the operating environment in the aforementioned composition system structure, thereby generating a test structure.

Figure 5:
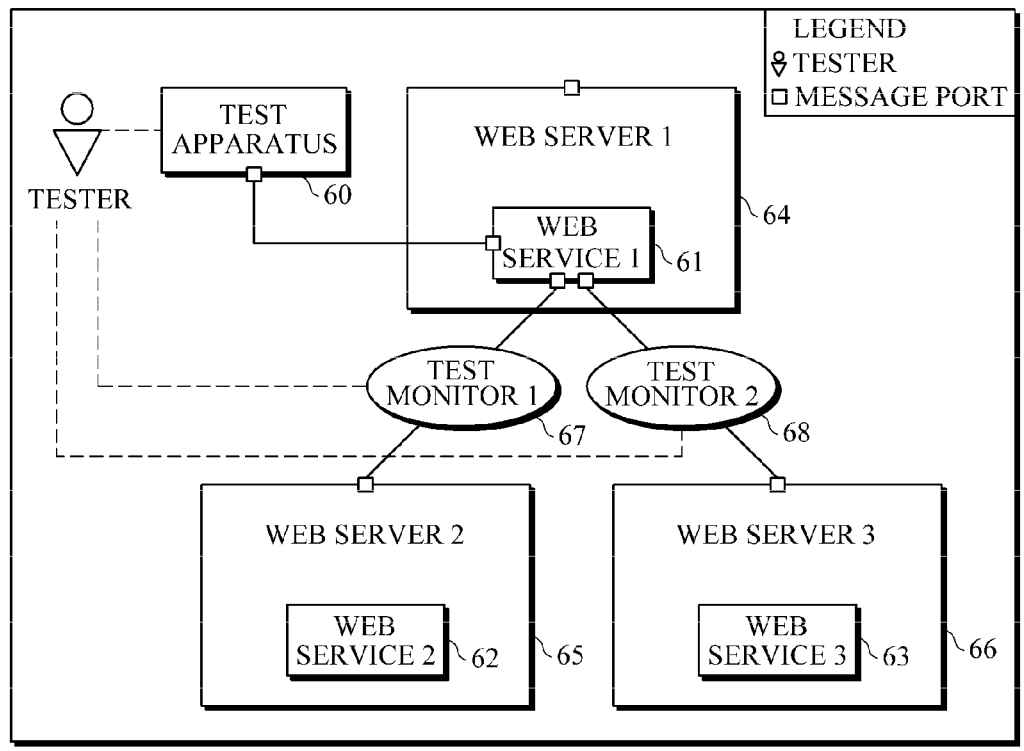
FIG. 5 illustrates a physical web service test structure according to an exemplary embodiment of the present invention.

The information about the operating environment in which a web service test is carried out can be obtained in various ways. For example, the information about the operating environment may be input by a user, or automatically generated according to an algorithm programmed on the basis of the analyzed content of the SSDL. FIG. 5 that will be described later illustrates such information about a test structure in the form of a physical system.

Meanwhile, the aforementioned composition system structure may include a structure in which at least one control web service controls other web services using a SOAP message and provides a required service function to a service requester.

Alternatively, in the composition system structure, all web services equally interoperate with each other. The composition system structure may include a structure in which a plurality of web services separately perform their own functions and interoperate with each other without depending on control of another web service.

The test case generator 130 generates a set of interoperability test cases (referred to as "test cases") from the aforementioned state model of the composition system and the test structure (26). As mentioned above, the state model of the composition system includes information about in what state what kind of message can be exchanged when web services interoperate with each other, and the test structure includes the information about the detailed test operating environment for web services interoperating with each other. Thus, a test case can be generated on the basis of the information.

The test case includes the definitions of execution functions for testing whether or not web services interoperate with each other according to a message exchange operation sequence defined in the SSDL specification. Thus, it is tested in the test case whether the web services normally operate according to a message exchange operation sequence defined in the SSDL specification. The test case is illustrated in FIG. 7 by example.

The test case executor 140 inputs a value for a parameter to the test case and tests whether web services interoperate with each other according to the message exchange operation sequence defined in the SSDL specification using the value. When the value of a message parameter is input to the test case, a set of test cases that can be actually executed is generated, and interoperability between web services can be tested using the set of test cases (27).

To be specific, when a SOAP message is transmitted, the message has a parameter, and the test case executor 140 may assign a parameter value to a test case and test whether web services to be tested operate according to the SSDL specification.

After this, the test case executor 140 records and outputs a determination result of the test, such as acceptance, rejection, and reserve determination in a test result document (28).

Meanwhile, the operational specification storage 150 stores the analyzed content of the SSDL specification, and the stored content is converted into an FSP model. In other words, the SSDL specification stored in the operational specification storage 150 includes content related to a message exchange operation in which a web service exchanges a SOAP message with the outside.

To be specific, the operational specification storage 150 may include content of a message transmission operation 31, a message reception operation 32, a message exchange operation sequence 33, a message exchange operation selection 34, message exchange operation parallelization 35, and message exchange operation repetition 36, and the content may be expressed and stored in extensible markup language (XML). This will be described later with reference to FIG. 3.

Here, the message transmission operation 31 denotes an operation of transmitting a SOAP message to another web service or service requester. The message reception operation 32 denotes an operation of receiving a SOAP message from another web service or service requester.

The message exchange operation sequence 33 denotes an operation sequence for exchanging a SOAP message. The message exchange operation selection 34 denotes that only one of two or more SOAP message exchange operations is selected and performed.

The message exchange operation parallelization 35 denotes that SOAP message exchange operations are simultaneously performed. The message exchange operation repetition 36 denotes that SOAP message exchange operations are repeatedly performed. These operation details may be converted into an FSP in compliance with the conversion rule of FIG. 3, which will be described later.

When web services constituting a business process interoperate with each other on the basis of a SOAP message in a service oriented architecture (SOA) environment in which a new business process can be rapidly composed of web services, it is possible to check whether or not the web services functionally interoperate with each other for the purpose of business without problems.

FIG. 3 illustrates a rule for converting a web service operation into an FSP according to an exemplary embodiment of the present invention.

As illustrated in FIG. 3, context of an SSDL specification may include the aforementioned message transmission operation 31, message reception operation 32, message exchange operation sequence 33, message exchange operation selection 34, message exchange operation parallelization 35, message exchange operation repetition 36, and so on.

For example, an exchange operation may be converted into an FSP action label, and the conversion may be carried out in compliance with a rule such as "send/receive_message-name_participant-name." Here, a sequential operation is converted into ";", a selection operation is converted into "|", and parallelization and repetition operations are converted into "||".

Next, the state model of a composition system may be obtained by composing FSP models of web services that are converted into FSPs by a parallelization operation ("||"). For example, the state model of a composition system in which three web services W1, W2 and W3 interoperate with each other can be generated such as "SystemBehavior=W1||W2||W3."

FIG. 4 illustrates a composition system structure according to an exemplary embodiment of the present invention. When a message interoperation relationship between web services interoperating with each other is analyzed from the content of an SSDL specification, information about a composition system structure indicating how the respective web services synthetically interoperate with each other can be obtained on the basis of the analyzed relationship.

In other words, content related to a message exchange operation of separate web services is included in the content of an SSDL specification. For example, it is assumed that content about separate message exchange operations performed by web service A and web service B is included in an SSDL specification, and web service A and web service B interoperate with each other.

In this case, synthesized information in accordance with interoperation between web service A and web service B is generated as information about the composition system on the basis of the analysis on the content of an SSDL specification.

Here, the information about a composition system structure may be in the form of an FSP model. The composition system structure may include a structure in which one control web service controls other web services using a SOAP message, and FIG. 4 illustrates a logical relationship between web services on the basis of information on such a composition system structure.

As illustrated in FIG. 4, when a "service request" message is received from a web service requester 500 (51), a control web service 510 exchanges a message with participant web service 1 520 (operations 52 and 53), exchanges a message with participant web service N 530 (operations 54 and 55), and finally transmits a "service response" message to the web service requester 500 (56).

Here, the web service requester 500 of FIG. 4 can be replaced by a test apparatus in FIG. 5, which will be described later, and a test monitor can be disposed between the respective web services 510, 520 and 530. Information about such an operating environment can be generated as information about a test structure. FIG. 5 that will be described below illustrates a physical system actually constituted on the basis of such information about a test structure.

FIG. 5 illustrates a web service test structure according to an exemplary embodiment of the present invention.

As described above, a test structure for a web service interoperability test can be generated on the basis of information about a composition system structure. As illustrated in FIG. 5, a tester can determine whether or not web services interoperate with each other by transmitting a SOAP message from a test apparatus 60 to web servers.

Here, web service 1 61, web service 2 62, and web service 3 63, which are test target web services, are installed in web server 1 64, web server 2 65, and web server 3 66 and interoperate with each other while exchanging a SOAP message. Test monitor 1 67 checks whether a SOAP message is normally exchanged between web service 1 61 and web service 2 62, and test monitor 2 68 checks whether a SOAP message is normally exchanged between web service 1 61 and web service 3 63.

After this, the tester combines test results generated from the test apparatus 60, test monitor 1 67, and test monitor 2 68, and determines a test case as acceptance when the test case is determined to be accepted. In this way, information about an operating system in which a web service test is carried out is included in a composition system structure which includes structured information about web services performing a message exchange operation, and generated as a web service test structure.

FIGS. 6A and 6B illustrate a state model of a composition system according to an exemplary embodiment of the present invention.

A state model of a composition system expresses operation in which web services exchange a message when the web services interoperate with each other as a state machine.

As illustrated in FIGS. 6A and 6B, an oval denotes a state of a system in which several web services are combined, and an arrow denotes an operation of transmitting or receiving a SOAP message, which causes state transition. Also, an exclamation mark (!) denotes message transmission, and a question mark (?) denotes message reception. For example, !ItemOrder_Cli_Sh denotes an operation of transmitting ItemOrder SOAP message from Cli web service to Sh web service.

Content in parentheses denotes a transition condition that allows operation. For example, !OrderAck_Sh_Cli operation is performed when the number of items is greater than 0, that is, NumofItem>0.

FIG. 7 illustrates a test case generated from information about a test structure and a composition state model according to an exemplary embodiment of the present invention.

As described above, a test case in which it is possible to test whether web services normally operate according to a message exchange operation sequence defined in an SSDL specification can be generated from information about a test structure and information about a composition state model. The test case includes the definitions of execution functions for testing whether or not the web services interoperate with each other according to the message exchange operation sequence defined in the SSDL specification. For example, as illustrated in FIG. 7, test goal T1 is a test case for checking whether or not test target web services comply with an operation sequence between state S1 and state OrderAccepted. In test case TC1, ItemOrder message is transmitted to test apparatus TesterA, OrderAck message is is received from TesterA, and then it is verified whether the state of a system is OrderAccepted.

In a test case, Preamble is a function for preparing a test target web service in a designated state, and State_verify is a function for verifying the state of a test target web service. PCO1 denotes a test monitor.

By testing web services using such a test case, it is possible to efficiently test whether or not web services, which interoperate with each other on the basis of a message to provide a business process, functionally operate without problems.

Also, it is possible to systematically detect a control flow error and a data flow error that may be caused by composition of web services in the form of black box.

Meanwhile, the respective components shown in FIG. 1 can be implemented as modules. These modules are software components or hardware components such as a field programmable gate array (FPGA) or application specific integrated circuit (ASIC), and perform certain operations. However, the modules are not limited to software or hardware. The modules may be in a storage medium that can be addressed, and may execute on one or more processors. Functions provided by components and modules may be combined into a relatively small number of components and modules, or subdivided into additional components and modules.

The exemplary embodiments of the present invention can also be embodied as computer-readable codes on a computer-readable recording medium. Codes and code segments constituting the programs can be easily deduced by computer programmers skilled in the art. The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, and optical data storage devices. The computer-readable recording medium can also be distributed over network connected computer systems so that the computer-readable code is stored and executed in a distributed fashion.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. An apparatus for testing web service interoperability, comprising at least one processor for executing:

a state model generator generating a state model of a composition system expressing an operation of exchanging a message when web services interoperate with each other as a state machine on the basis of content of a simple object access protocol (SOAP) service description language (SSDL) web service specification;

a test structure generator generating a web service test structure by including information about an operating environment in which a web service test is carried out in a composition system structure that includes structured information about web services performing a message exchange operation;

a test case generator generating a test case including definitions of execution functions for testing whether or not the web services interoperate with each other according to a message exchange operation sequence defined in the SSDL specification, from the state model of the composition system and information about the web service test structure; and a test case executor inputting a value to the test case to cause test target web services to execute the test case and testing whether the web services interoperate with each other according to the message exchange operation sequence defined in the SSDL specification.

2. The apparatus of claim 1, wherein the composition system structure includes a structure in which at least one control web service controls other web services using a SOAP message.

3. The apparatus of claim 1, wherein the composition system structure includes a structure in which the web services separately perform their own functions and interoperate with each other without depending on control of another web service.

4. The apparatus of claim 1, wherein the state model generator includes a finite state process (FSP) modeling unit modeling the content of the SSDL web service specification into an FSP, and generates the state model of the composition system on the basis of content included in the modeled FSP.

5. The apparatus of claim 1, further comprising an operational specification storage storing the content of the SSDL web service specification.

6. The apparatus of claim 1, wherein the SSDL web service specification includes content related to the message exchange operation of the web services.

7. A method of testing web service interoperability, comprising:

generating, at a state model generator, a state model of a composition system expressing an operation of exchanging a message when web services interoperate with each other as a state machine on the basis of content of a simple object access protocol (SOAP) service description language (SSDL) web service specification;

generating, at a test structure generator, a web service test structure by including information about an operating environment in which a web service test is carried out in a composition system structure that includes structured information about web services performing a message exchange operation;

generating, at a test case generator, a test case including definitions of execution functions for testing whether or not the web services interoperate with each other according to a message exchange operation sequence defined in the SSDL specification, from the state model of the composition system and information about the web service test structure; and inputting, at a test case executor, a value to the test case to cause test target web services to execute the test case and testing whether the web services interoperate with each other according to the message exchange operation sequence defined in the SSDL specification.

8. The method of claim 7, wherein the state model generator models the content of the SSDL web service specification into a finite state process (FSP), and generates the state model of the composition system on the basis of content included in the modeled FSP.

9. The method of claim 7, wherein the composition system structure includes a structure in which at least one control web service controls other web services using a SOAP message.

10. The method of claim 7, wherein the composition system structure includes a structure in which the web services separately perform their own functions and interoperate with each other without depending on control of another web service.

11. The method of claim 7, wherein the SSDL web service specification includes content related to the message exchange operation of the web services.

* * * * *